United States Patent [19]

Goldhor et al.

[11] Patent Number: 5,231,670

[45] Date of Patent: Jul. 27, 1993

[54] VOICE CONTROLLED SYSTEM AND METHOD FOR GENERATING TEXT FROM A VOICE CONTROLLED INPUT

[75] Inventors: Richard S. Goldhor, Belmont; John F. Dooley, Reading; Christopher N. Hume, Belmont; James P. Lerner, Newton; Brian D. Wilson, Holliston, all of Mass.

[73] Assignee: Kurzweil Applied Intelligence, Inc., Waltham, Mass.

[21] Appl. No.: 855,461

[22] Filed: Mar. 19, 1992

Related U.S. Application Data

[63] Continuation of Ser. No. 57,332, Jun. 1, 1987, abandoned.

[51] Int. Cl.⁵ ............................................. G10L 5/00
[52] U.S. Cl. ............................................. 381/43; 395/2
[58] Field of Search ............................. 381/43–46; 395/2

[56] References Cited

U.S. PATENT DOCUMENTS

| | | |
|---|---|---|
| 3,418,429 | 12/1968 | Clapper . |
| 3,846,586 | 11/1974 | Griggs . |
| 3,989,897 | 11/1976 | Carver . |
| 4,144,582 | 3/1979 | Hyatt ................................ 381/44 |
| 4,435,617 | 3/1984 | Griggs ............................... 381/44 |
| 4,468,804 | 8/1984 | Kates et al. . |
| 4,507,750 | 3/1985 | Frantz et al. . |
| 4,520,501 | 5/1985 | DuBrucq . |
| 4,545,065 | 10/1985 | Visser . |
| 4,630,304 | 12/1986 | Borth et al. . |
| 4,661,915 | 4/1987 | Ott .................................... 381/44 |
| 4,829,576 | 5/1989 | Porter ............................... 381/44 |

Primary Examiner—Emanuel S. Kemeny
Attorney, Agent, or Firm—Henry D. Pahl, Jr.

[57] ABSTRACT

Disclosed is a system and method for generating text from a voice input that divides the processing of each speech event into a dictation event and a text event. Each dictation event handles the processing of data relating to the input into the system, and each text event deals with the generation of text from the inputted voice signals. In order to easily distinguish the dictation events from each other and text events from each other the system and method creates a data structure for storing certain information relating to each individual event. Such data structures enable the system and method to process both simple spoken words as well as spoken commands and to provide the necessary text generation in response to the spoken words or to execute an appropriate function in response to a command. Speech recognition includes the ability to distinguish between dictation text and commands.

25 Claims, 11 Drawing Sheets

VOICE CONTROLLED SYSTEM AND METHOD FOR GENERATING TEXT FROM A VOICE CONTROLLED INPUT

This is a continuation of co-pending application Ser. No. 07/057,332 filed on Jun. 1, 1987 now abandoned.

BACKGROUND OF THE INVENTION

The present invention relates to text generating systems that generate text from a voice input and more particularly to a text generating system that generates text from a voice input and also accepts voice generated control commands with the ability to distinguish between the input and the commands.

Voice controlled text generating systems generally include a microphone for detecting speech signals. A speech signal processor transforms the detected speech signals into a representation for recognition by a processor (e.g. short term spectral cross-sections). A speech signal processor transmits the processed signals to a speech event analyzer which generates a set of recognition candidates in response to each detected speech event. A recognition candidate is a vocabulary item which is stored in a system memory (not shown) that is similar to the detected speech event which represents the spoken word or phrase. The system creates a candidate set that includes all of the recognition candidates, or in other words, the candidate set includes all known vocabulary items which are sufficiently similar to the detected speech event that the speech event analyzer 16 decides that there is a high degree of probability that the speech event is an instance of the vocabulary item represented by the recognition candidate.

In order to enable the system to choose the most appropriate candidate, the system assigns a recognition score to each candidate. The recognition score indicates the likelihood that the speech event is an instance of the candidate, and after processing is complete, the recognition candidate with the highest recognition score is designated the "Best Match". The system then selects the "Best Match" as the candidate representing the chosen vocabulary item.

After the best match candidate has been selected, the system translates the candidate and transmits the translated candidate to the application. In other words, the translation is the input to the application that has been designated as the input to be sent when the candidate is chosen as best match for a particular state of the recognizer. As a result, in theory, there is a specified translation for each combination of best match vocabulary item and recognizer state. Often, of course, a translation is simply the spelling of the best match word or phrase, but it can be any legal input to the application.

In addition to including the capability of accepting voice input and deriving the corresponding text to that voice input, it is also desirable to be able to control the system through the use of voice commands. In such a system, the voice commands actuate assigned tasks in response to the voice commands. This is especially important for a system designed for use by handicapped individuals or for a system designed for use by an individual who does not have free use of his/her hands because the hands are occupied with another task during use of the system. Moreover, when a text generating system is used for dictation, the person dictating usually can not efficiently use a keyboard, and voice operated commands would greatly facilitate use of the system.

Known systems treat verbal input as typed input, or in other words, convert the speech into keystrokes. A speaker, however, supplies input to the system in word units, and verbal commands are more easily understood in terms of word units rather than characters. For this reason, known systems do not make effective usage of vocal commands, especially commands involving backtracking through documents.

Another problem with known systems is that they assume that each input character is correct, and as a result the systems do not efficiently correct mistakenly translated verbal input.

It is therefore a principal object of the present invention to provide a system and method for generating text from a voice input that organizes and records information about system state and verbal and non-verbal input.

Another object of the present invention is to provide a system and method for generating text from a voice input that reliably and effectively implements system functions which make it possible for the user to inform the system of misrecognitions; for the system to undo the effects of said misrecognitions; for the user to control the application by referring directly to earlier events in the dictation process; and for the system to control and modify the recognition of speech, including the ability to learn from earlier misrecognitions.

A still further object of the present invention is to provide a system and method for generating text from a voice input that organizes the process of speech dictation to computerized systems, and the response of those systems, into similar structures which can be used to effectively control and modify system operation.

A further object of the present invention is to provide a system and method for generating text from a voice input that groups and organizes the various inputs in a manner that facilitates retrieval of any input.

SUMMARY OF THE INVENTION

Accordingly, the system and method for generating text from a voice input of the present invention divides the processing of each speech event into a dictation event and a text event. Each dictation event handles the processing of data relating to the input into the system, and each text event deals with the generation of text from the inputted voice signals. In order to easily distinguish the dictation events from each other and text events from each other the system and method creates a data structure for storing certain information relating to each individual event. Such data structures enable the system and method to process both simple spoken words as well as spoken commands and to provide the necessary text generation in response to the spoken words or to execute an appropriate function in response to a command.

These and other objects and features of the present invention will be more fully understood from the following detailed description which should be read in light of the accompanying drawings in which corresponding reference numerals refer to corresponding parts throughout the several views.

DETAILED DESCRIPTION OF THE PREFERRED EMBODIMENTS

Figure 1:
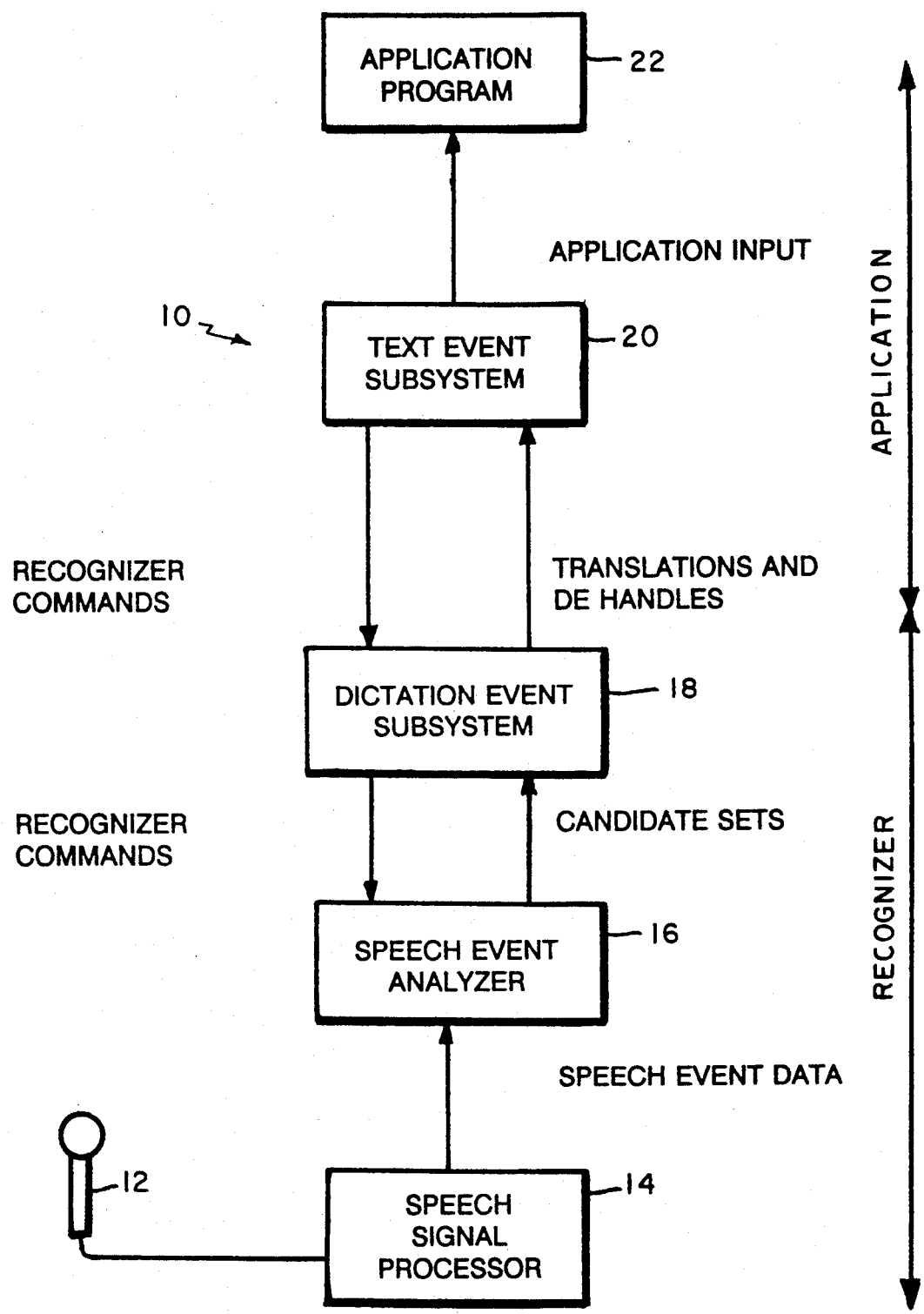
FIG. 1 is a schematic diagram of the voice input-text generating system of the present invention.
Figure 12:
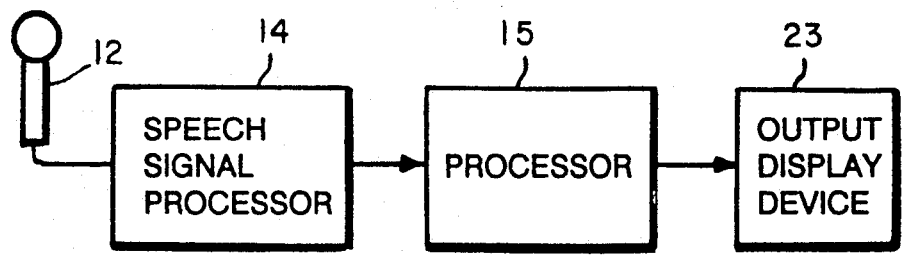
FIG. 12 is a block diagram of the components of the system of the present invention.

Referring to FIGS. 1 and 12 the system for generating text from voice input of the present invention includes a microphone 12 or other voice input means attached to a speech signal processor 14 which converts the speech signals into digital data that can be processed by processor 15. The processor 15 performs several distinct functions, including serving as the speech event analyzer 16, the dictation event subsystem 18, the text event subsystem 20, and the executor of the application program. The speech signal processor 14 generates speech event data and transmits this data to the processor 15 to be processed first by the speech event analyzer 16. The speech event analyzer 16 generates a list or set of possible candidates that represent the voice input processed by the speech signal processor 14. The speech event analyzer 16 transmits the candidate sets to a dictation event subsystem 18. The dictation event subsystem 18 analyzes the candidate sets and chooses the "BEST MATCH", i.e. the candidate with the highest degree of similarity. This candidate is then considered the correct translation, and the dictation event subsystem forwards the translation to text event subsystem 20 which in turn inputs the translated text to an application. During the execution of the application, text can be displayed on output display device 23, which can be a CRT, printer, etc.

The recognition candidates that are included in the candidate sets transmitted from the speech event analyzer 16 to the dictation event subsystem 18 are vocabulary items similar to the detected speech event. The entire set includes all known vocabulary items which are sufficiently similar to the detected speech event that the speech event analyzer 16 decides there is an appreciable possibility that the speech event was an instance of the vocabulary item. Each candidate includes an associated recognition score which indicates the likelihood that the speech event is an instance of that candidate.

The translation input to the application when a particular candidate is chosen as best match generally represents the spelling of that particular candidate word or phrase. As will be described below, the translation may also be any other legal input into a particular application, and the translation may in fact be used to control the application by voice. The translation may also include input to the recognizer whereby the operation of the recognizer can be controlled and its state changed.

As mentioned above, a dictation event describes the operation of the system of the present invention at the input stage of the system. A dictation event record is a formal data object that describes the speech event, and the speech event is an occurrence in the speech signal of an event interpreted as a word or phrase by the recognizer. For each such speech event, the recognizer stores useful information in a dictation event database and provides techniques (commands, subroutine calls, macros, etc.) by which certain specified operations may be performed on the dictation event database. Before discussing these various operations the structure of each individual data element in each record of the dictation event database will be described.

Figures 2, 3:
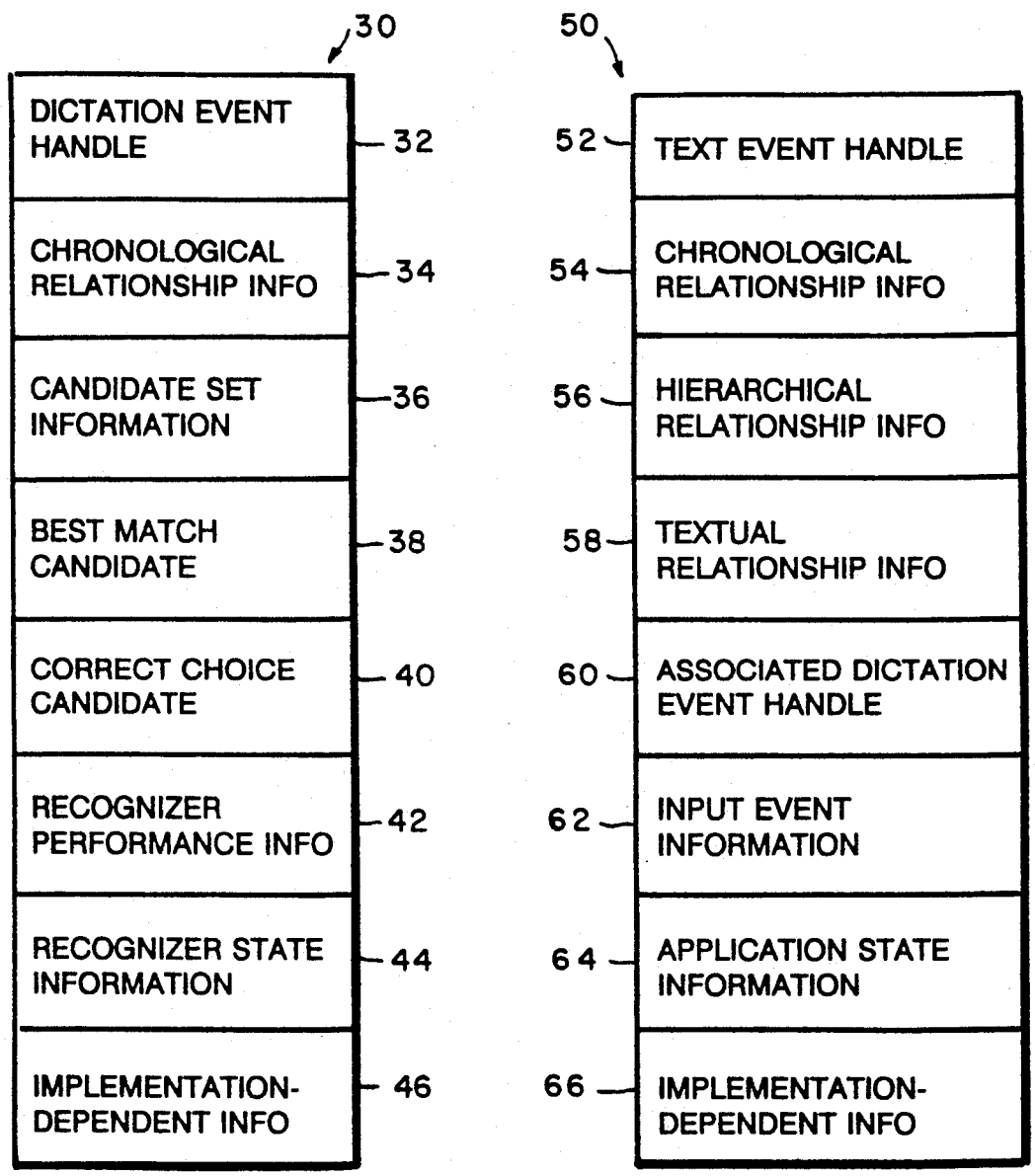
FIG. 2 is a diagram of a typical data structure utilized to represent each dictation event created by the system and method of the present invention.
FIG. 3 is a diagram of a data structure used to represent each text event generated in response to a dictation event by the system and method of the present invention.

Referring now to FIG. 2, there is shown a dictation event record 30 of the dictation event database for a single dictation event. Each record includes a dictation event handle 32 which is generally an address in the database where this record is stored. The chronological relationship information element 34 includes addresses or pointers to other dictation event records created immediately before and immediately after the current dictation event record.

The candidate set information element 36 contains information relating to each of the potential recognition candidates that is chosen by the speech event analyzer 16, and in one embodiment this information is a list of hash codes representing each one of the candidates. Element 36 of the dictation event record 30 will also frequently include the recognition scores representing the probability that each candidate is the best match for the speech event data transmitted to the speech event analyzer 16. The best match candidate element 38 indicates the candidate chosen as the best match and in one embodiment this element is an index into the candidate set contained in element 36. In other words, element 38 points to the best match candidate in the candidate set. The correct choice element 40 of the dictation event record is also an index into the candidate set that points to the correctly translated speech pattern. Of course, this record may point to the same candidate as the best match candidate element 38.

The recognizer performance information element 42 is a rather large substructure of the dictation event record 30. This element 42 receives data from various modules in the recognizer, and this data represents a variety of information items regarding the performance of the recognizer. For example, in a preferred embodiment element 42 includes an internal representation of the waveform. By storing this internal representation, the system may playback the speech represented by the waveform. This element may also contain information concerning the acoustic characteristics of various spoken phrases and may also include thresholds used internally to choose candidates.

The recognizer state information element 44 contains state variables that insure that the same input to the system 10 provides the same output. In addition, for each dictation event the recognizer state information element 44 stores information describing the state of the recognition program. This information enables all values to be exactly reset and avoids causing the system to re-learn correct translations for speech events. The final element shown in the dictation event record is implementation-dependent information element 46. Element 46 stores many different data items, including, for example, data that allows the updating of vocabulary recognition data as a result of the way a speaker says words.

A dictation event and consequently a dictation event record 30 is created as part of the process of recognizing a word. The creation of a dictation event record includes the allocation or reservation of memory space in the dictation event database for the dictation event record which will store the information described above and shown in FIG. 2. The data record 30 is also initialized at the time it is created, and the system generates a dictation event handle 32 which uniquely specifies that dictation event record 30. Handle 32 is stored for each specific dictation event record by each facility within the recognizer or application which may later want to refer to a particular dictation event. Once the system creates a dictation event record 30 a dictation event can be selected as the active dictation event for any dictation event operation by specifying its dictation event handle. Alternatively, a dictation event can be selected by specifying another dictation event which stands in some relationship to the desired dictation event (such as chronologically following it) and specifying the relevant relationship. If no dictation event is currently active a "null dictation event" may be specified.

As described above, a candidate set is associated with each dictation event. From this set, the system chooses a best match candidate. Several operations can be performed on a dictation event record that relates to the candidate set of the dictation event. In particular, a recognition candidate in the set can be marked as incorrect; a candidate can be marked as selected (i.e., can be specified by the user as a correct recognition for the speech event which the dictation event represents); candidates in the set can be reordered so that for any speech event a different candidate than the candidate originally determined by the system is produced as a best match candidate each time the speech event occurs. Finally, the entire candidate set can be retrieved for display to enable a user of the system to select the correct candidate or for further processing.

Another important operation performed on the dictation event database is the resetting of the state of the recognizer to the recognizer state at the time of the occurrence of a speech event. A common example of this resetting is the re-analysis of an utterance which was incorrectly recognized. It is the recognizer state information 44 stored in the dictation event record 30 that is used to perform the reset operation, and as discussed above this information includes state variables that enable the system to provide the same output for the same input.

The system 10 of the present invention generally maintains the dictation event database only within a given dictation session and not between sessions. However, as users of the system will frequently interrupt a dictation session and continue at a later time either the entire dictation event database or individual dictation event records can be permanently stored in files for use either in analyzing the performance of the recognizer or for recreating the dictation session at a later time.

The system 10 also allows dictation event records to be deleted from the dictation event database in order to minimize the amount of storage required for the dictation event database. Dictation event records may also be deleted in order to reduce the time required to perform other dictation event operations thereby reducing the searching time as well as the time associated with other operations. Typically, dictation events corresponding to the least recent speech events are removed first.

When the user, the recognizer or the application determines that the system correctly recognized a particular speech event or incorrectly recognized a speech event, a process of adapting the speech related data upon which the performance of the recognizer depends may be carried out. Information stored in the recognizer state information element 44 may be used in this process.

A chronological relationship exists between any two records of the dictation event database as one record was created before the other record. The speech event of the dictation event record that was created earlier occurred before the speech event of the dictation event which was created later. This chronological order can also be determined from the structure of the dictation event database. As described above the chronological relationship information element 34 generally will include a pointer to and from chronologically adjacent dictation event records.

After the system 10 of the present invention processes a dictation event, a text event is then created. Referring to FIG. 3, each text event record 50 is a formal data object which contains data describing an "input event". Such input events include the reception by an application of some input that can be treated as a single unit. One important class of input events are the reception of output from the recognizer and this output is generally in the form of translations. Other input events include typed input, input from pointing devices such as a mouse, etc.

For each input event, the application stores useful information in a text event database that includes a number of text event records 50. The application also provides techniques (commands, subroutine calls, macros, etc.) by which certain specified operations may be performed on the text event database. The term "text event" has been chosen to describe all application events whether or not the input events involve the processing or creation of text, and therefore text event records are also used to record information about all types of input events.

A text event record 50 of the text event database is created as part of the process of accepting input to the application. The creation includes the allocation or reservation of memory space in the text event database for the record which will store the information comprising the text event. The creation also involves the initialization of that data record, and the generation of a text event handle 52 which can be subsequently used to uniquely specify that text event.

As in the case of the dictation event handle 32, the text event handle 52 generally represents a memory address of a particular text event in the text event database. This handle is stored for each application facility that may later want to reference that text event record, as the text event can be referenced by specifying its text event handle. Alternatively, a text event can be referenced by specifying another text event record which stands in some relationship to the desired text event (such as chronologically following) and specifying the relevant relationship.

Each text event record contains data describing the input event which resulted in the creation of the text event. The actual input data itself may be stored in the text event record, and a code number is stored in the text event record that identifies the input event type. This data is stored in the input event information element 62. Examples of typical types of input events are: reception of a translation from a recognizer; keyboard input; input from a pointing device; and "input" from a preprogrammed application activity.

Each text event record 50 also includes a data element that provides chronological relationship information with respect to other text event records. As in the case of the chronological relationship information element 34 in the dictation event records 30, the chronological relationship information element 54 in the text event records 50 includes links to and from text event records that were created immediately before and after each event record.

Unlike dictation events, text events can have hierarchical relationships with respect to each other. Each text event record 50 contains a hierarchical relationship information element 56 identifying those text events which are either immediately superior or immediately inferior to itself. This superior and inferior relationship is created if a given text event is active when a new text event is created. In such a situation, the active text event is considered to be the superior of the next created text event. For any text event record in the text event database, it is possible to determine all superior text events (if they exist) and all of its inferior text events (if they exist). Of course this order is only a partial ordering since not all text events stand in a hierarchical relationship to each other. The data stored in the hierarchical relationship information element 56 may be either a list of addresses of the superior and inferior text event records or links and pointers to appropriate lists of superior and inferior text events.

The text event record 50 also includes a data element that stores the textual relationship information so that actual text may be linked. In other words, any two consecutive items of text are identified as being consecutive so that the systems may jump around to different text events and still maintain the proper order of the outputting text. This textual relationship information element 58 of each text event record is generally a pointer to and from each text event record which indicates the relative textual position of any two text events that have text associated with them. This feature is especially important in a word processing program where text is added to a target document. In such a situation, for any two text events which result in such addition of text to the same document an ordering can be determined which specifies which text event corresponds to text closer to the beginning of the document and which text corresponds to text closer to the end of the document. This, of course, is only a partial ordering since not all text events are associated with text in the same document.

Each text event record also contains an input event information element 62 describing the input which resulted in the creation of the text event. The actual input data itself may be stored in the text event record or a code number may be used and stored in the text event record that identifies the input event type. Examples of types of input events are: reception of a translation from the recognizer; keyboard input; input from a pointing device such as a mouse; and input from a preprogrammed application activity.

Each text event record 50 may be linked to a dictation event through an associated dictation event handle 60 that is stored only for those text events that are created as the result of a translation generated by the recognizer reacting to a speech event. All translations are accompanied by the dictation event handle of the dictation event which describes that speech event. This data element enables the system, at a subsequent point in time, to retrieve a dictation event handle and instruct the recognizer to perform a dictation event operation such as resetting the recognizer state.

The text event record 50 also includes an application state information element 64 that describes the relevant application system state at the time that the input event occurred. With this information it is possible, at a later time, to reset the application to its state at the time the input event occurred. Typical types of state information include the beginning and ending position of text in documents (for word processing applications), cursor positions, internal application mode information, etc.

Finally, each text event record 50 includes an implementation-dependent information element 66. An example of an implementation-dependent application is a provision allowing text to be highlighted. In this situation, element 66 will include data indicating whether the text of the text event should be highlighted.

The dividing up of the processing of speech events into dictation events and text events enables the system of the present invention to enhance the voice control of application programs. The utility of these data objects includes the effective deletion of text from incorrectly recognized words; the backtracking of the application (and the underlining recognizer) at the option of the user; the correction of recognition errors by voice; the organization of documents in word and phrase-level fields; the entry of data in structured reports by voice; the adaptation of recognizer performance to a particular speaker's voice by learning which words the speaker uses and how those words are pronounced; the effective communication of modules within the recognizer; and the post-hoc analysis of the recognizer performance.

Figures 4A, 4B:
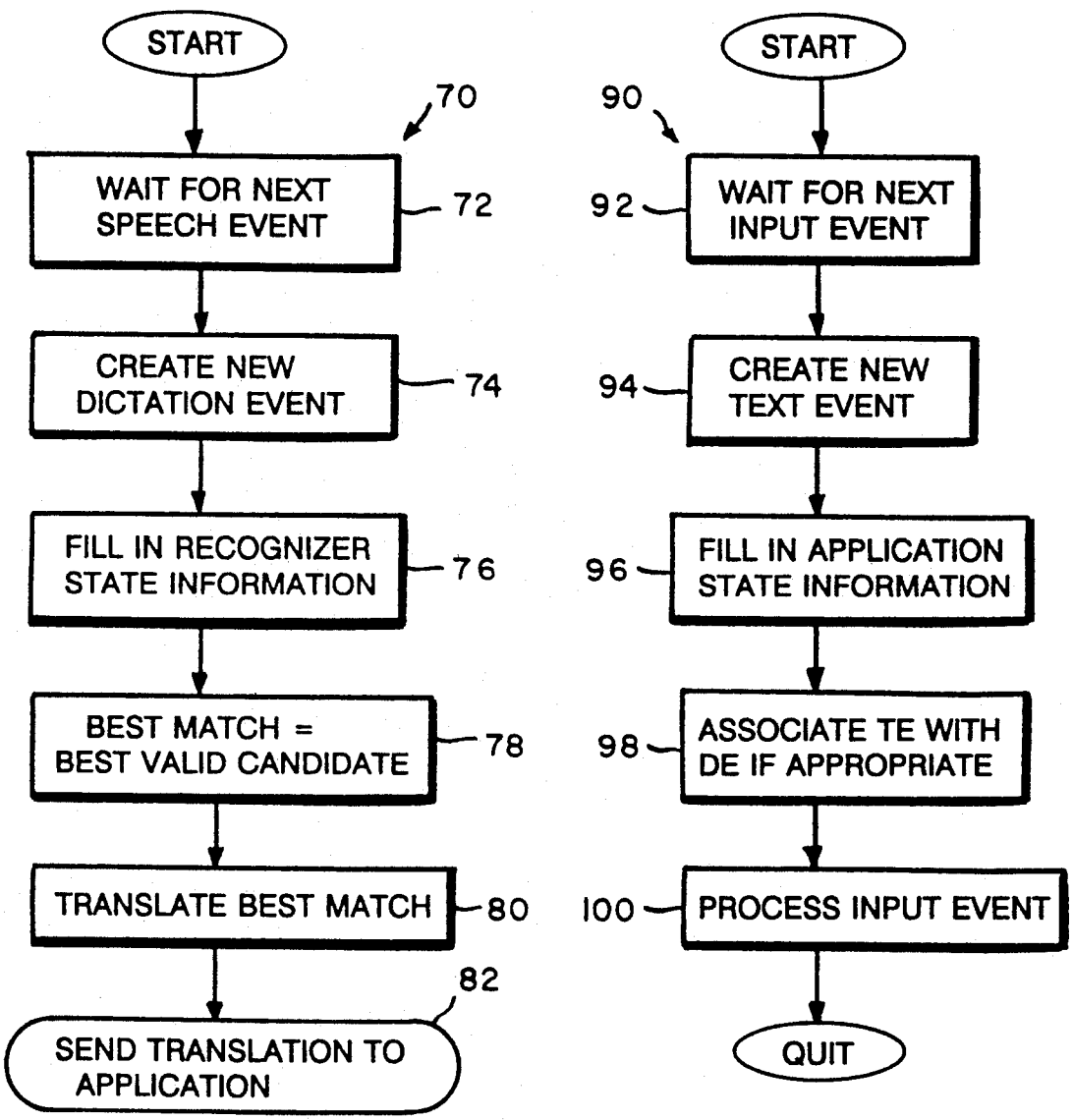
FIG. 4a is a flow chart of the operation of the system and method of the present invention in processing speech events.
FIG. 4b is a flow chart of the operation of the system and method of the present invention in processing input events.

Before discussing any of these special features, a description of the operation of the system that results in the generation of text will be explained. As shown in FIG. 4a, operation of the system begins with the waiting for a speech event to occur in step 72. Once a speech event is input to the system through the microphone 12, the system initiates a new dictation event by creating a dictation event record in the dictation event database in step 74. At this time, recognizer state information is inserted in the appropriate locations in the created dictation event record in step 76, and in step 78 the best match is determined as being the valid candidate with the highest recognition probability score. Once the correct choice has been made, the system in step 80 will translate the best match into the appropriate text, and the dictation event subsystem 18 sends the translation in step 82 to the application through the text event subsystem 20.

Prior to the translation being sent to the application by the text event subsystem 20, the text event subsystem 20 waits for a next input event to occur. When this input event occurs (such as when a translation is sent from the dictation event subsystem 18 to the text event subsystem 20) the system in step 94 creates a new text event record 50, and following this creation of the new record, inserts the proper chronological relationship information in element 54, the hierarchical relationship information in element 56, the textual relationship information in element 58 and the application state information in element 64. In step 98, the text event record 50 is associated with its dictation event record 30 if such association is appropriate. Finally, the input event is processed in step 100 by the text event subsystem by the forwarding of the translation to the application. At this point, the processing of the speech event as dictation and text events is concluded.

As discussed above, a principal feature of the present invention is the ability of the system to effectively control and modify system operation through verbal commands that allow the user to refer directly to earlier events in the dictation process. In a preferred embodiment, the system includes several such spoken commands, and a description of the more important of these commands is provided below.

"SCRATCH THAT"—The phrase "SCRATCH THAT" is identified by the recognizer as a special phrase. The intent of the phrase is to cause the effect of the previous voice command to be undone (specifically, in word processing situations, to cause the text entered as a result of the previous speech event to be removed from the document). In a preferred embodiment, the previously active dictation event is examined to determine the number of characters in the translation that were sent to the application. The identical number of rubout characters is then transmitted to the application, and the recognizer state is reset to its value at the time the previous speech event occurred. In other embodiments a command may be transmitted to the application, instructing the application to remove from the document the text associated with the previous text event. In order to erase several words or phrases the voice command is simply repeated.

Figure 5:
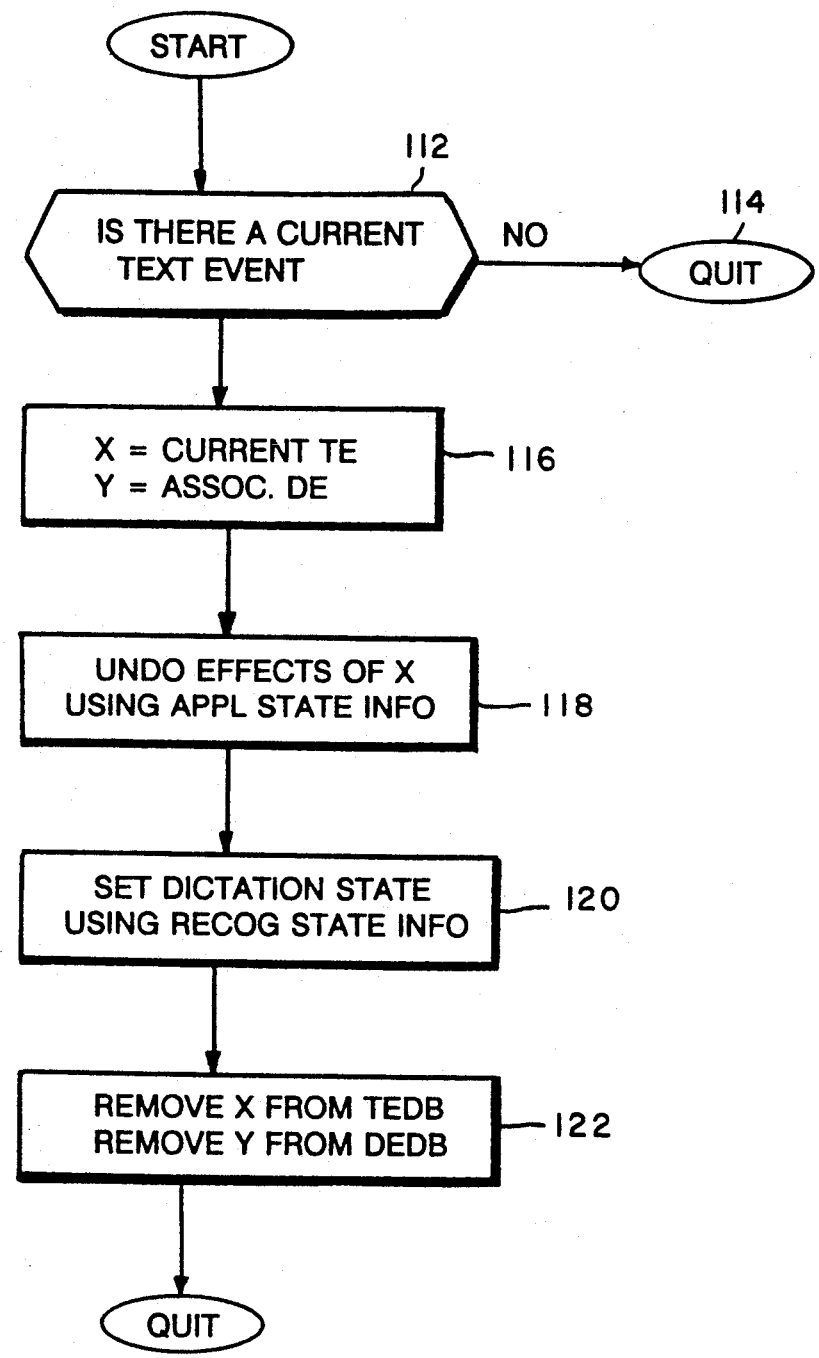
FIG. 5 is a flow chart of the operation of the system and method of the present invention in response to a "SCRATCH THAT" command.

Referring to FIG. 5, in response to a "SCRATCH THAT" command, the system determines whether there is an active text event. If there is no active text event, then there is no input to be erased, and the system ceases processing of the "SCRATCH THAT" command. If there is a current text event the associated dictation event record is retrieved and the system removes the effects of the current text event in step 118 by using the information stored in the application state information element 64. For example, a word processing application will move the cursor position back to its position prior to the active text event and will recognize that the translated text is not valid and should be removed. The dictation state must also be corrected and the system in step 120 resets the dictation state to its state prior to the speech event using the information stored in the recognizer state information element 44. The final step 122 in the "SCRATCH THAT" command is to remove the current text event record from the text event database and the associated dictation event record from the dictation event database.

Figure 6:
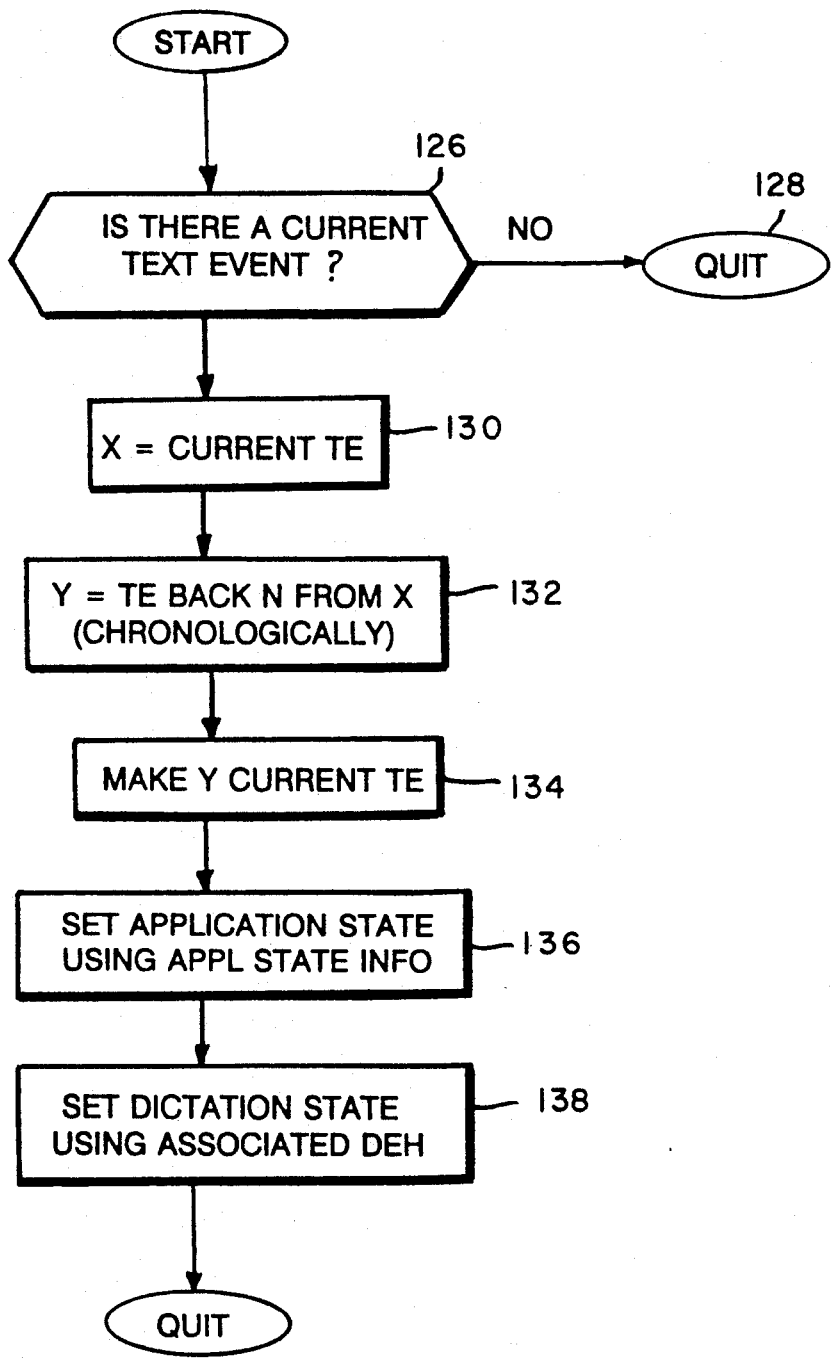
FIG. 6 is a flow chart of the operation of the system and method of the present invention in response to a "FORWARD N" command.

"FORWARD N"—Referring to FIG. 6, the "FORWARD N" command causes the data entry position of the application to be moved forward to a position "N" text events from its current position. Again before processing this command, the system determines in step 126 whether there is a currently active text event. If an active text event exists the system in step 130 retrieves the text event record for the active text event. The system, in step 132, then retrieves the text event record of the text event which is chronologically positioned "N" positions after the active text event. This text event is then made the active text event in step 134 and the application state information element 64 is then corrected to reflect this change. Using the associated dictation event handle 60, in step 138 the dictation state is also updated in recognizer state information element 44.

"BACK N"—The phrases "BACK TWO", "BACK THREE", etc., are identified by the recognizer as special phrases. The intent of these phrases is to cause a data entry position of the application (typically called the cursor position) to move to where it was "N" speech events ago. Note that this command is different from the "SCRATCH THAT" command in that the effects of the latest speech events are not erased, although the cursor position is changed, and the application and recognizer context that existed previously are reestablished.

Figure 7:
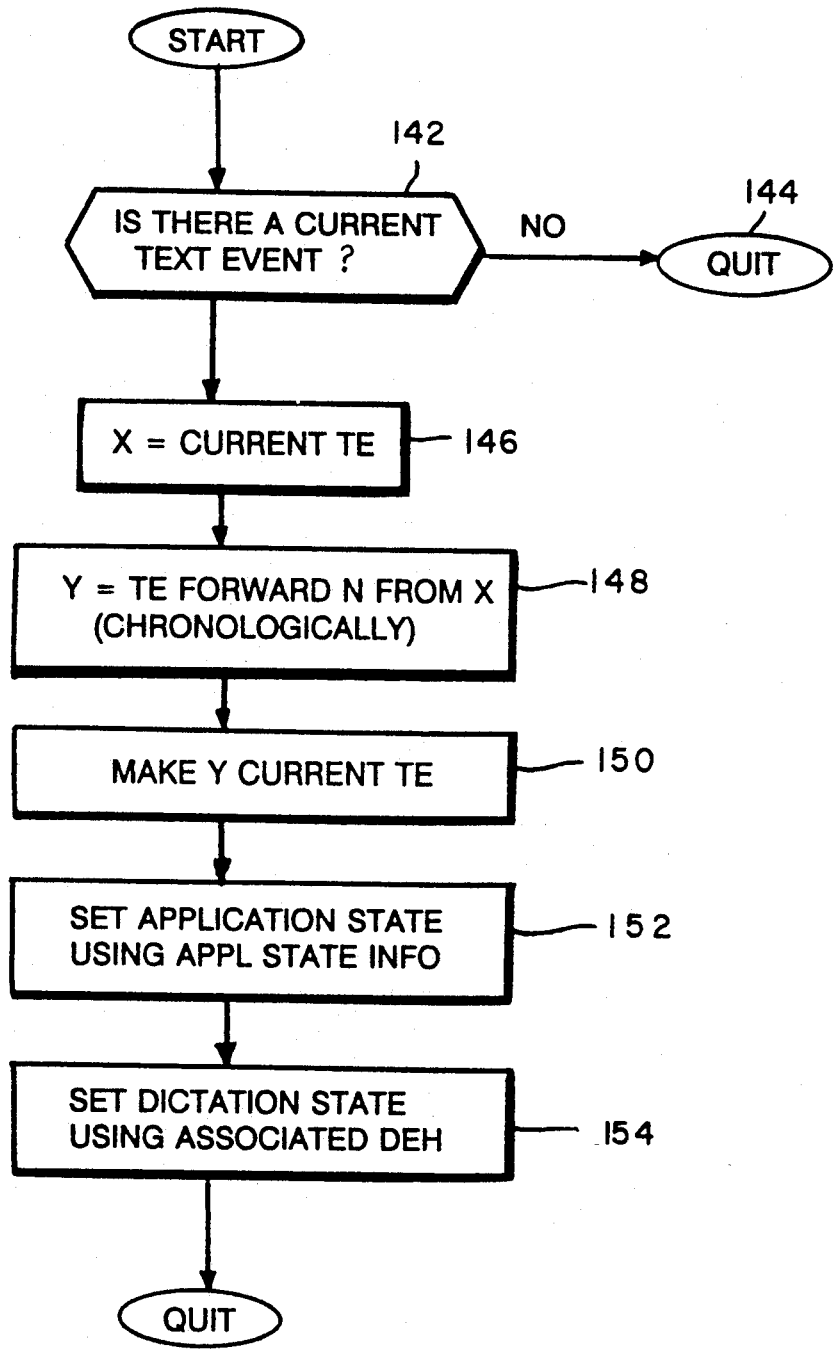
FIG. 7 is a flow chart of the operation of the system and method of the present invention in response to a "BACK N" command.

Initially upon receiving the "BACK N" command, the system as shown in FIG. 7 determines in step 142 whether there is a current text event, and if a current text event exists the system fetches the text event record of the current text event in step 146. The text event record that is chronologically positioned "N" places before the active text event record is also fetched in step 148. The system then marks the text event record which was located "N" positions back from the active text record as the new active record in step 150. Then, in step 152 the application state is reset through the information stored in the application state element 64, and the state of the dictation event is changed by accessing the associated dictation event record by using the associated dictation event handle 60. At no time during the operation of this command is data removed from the dictation event data base or the text event data base.

"BACKTRACKING"—There are many situations in which it is desirable to "undo" one or more voice commands. To effectively accomplish this task, both the recognizer and the application must be reset to a previous state, and selected data which has been entered into the recognizer or application database (such as text in documents being created by a word processing application) must be removed. In general, such goals are accomplished by specifying which dictation events are to be backtracked through. Sufficient information is stored in each dictation event record to identify which recognizer state variables were changed, what their previous values were, and which recognizer databases were changed and in what way. Since chronological relationships exist between dictation event records in the dictation event database, dictation event records can be selected in the proper sequence to undo all changes from the present moment back to the last dictation event to be backtracked through. Also, since text events are tied to dictation events and a chronological order exists among all text events, a similar backtracking procedure can be accomplished for the application.

Figure 8:
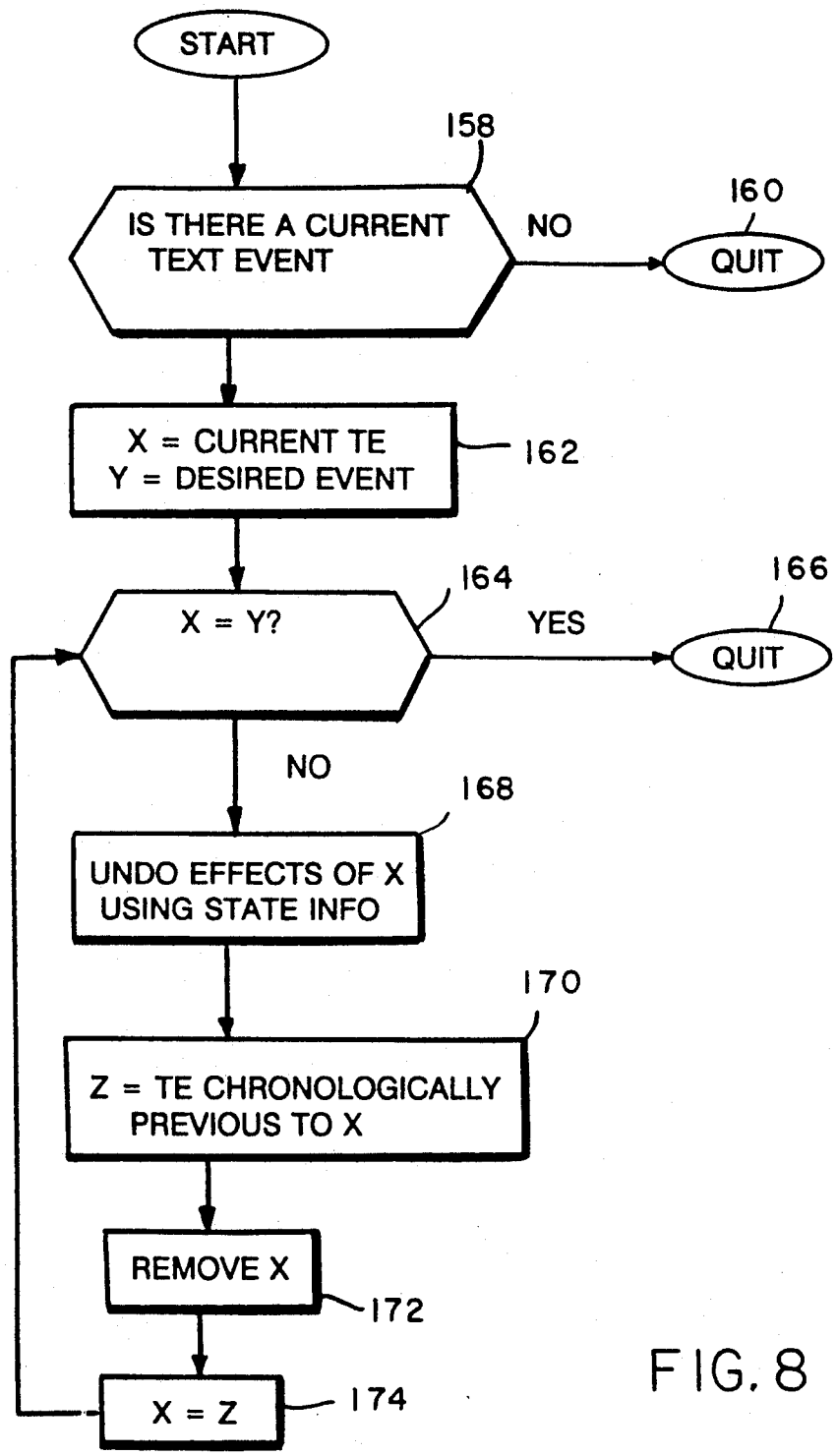
FIG. 8 is a flow chart of the operation of the system and method of the present invention in response to a "BACKTRACK" command.

Referring to FIG. 8, upon receiving a "BACKTRACK" command, the system determines whether there is a current text event in step 158. If there is an active text event, the active text event record is fetched, and in step 164 the system determines whether the active text event is the desired event, and if they are the same, the system returns to normal operation in step 166. If the comparison performed in step 164 reveals that the active text event and the desired text event are not the same, the system will fetch the state information stored in the application state information element 64 of the active text event record and undo the effects of the active text event. The system then fetches the text event record of the text event chronologically previous to the active text event in step 170, and the previously active record is removed from the text event database in step 172. The text event that was chronologically prior to the now deleted text event record is then compared again in step 164 to the desired event. The system continues to go through this loop until the current text event record is the desired text event.

"FILL IN FORM"—An important use of speech recognition is in the generation of structured reports, which include frame material (e.g., "name: —") surrounding fields to be filled in. Dictation and text events can be used to allow such forms to be invoked by voice; individual fields selected; data entered into those fields; corrections made, etc. These techniques may be implemented using the hierarchical characteristics of the text events.

In implementing a "FILL IN FORM" command a single text event is associated with the entire form. Inferior text events are then associated with each field in the form and the textual relationship characteristics of these texts events are used to specify which text event records are associated with which logical field. The application dependent information elements in the text event record associate locations in the document text with logical fields. Fields can be filled in, erased and corrected using the other commands described herein.

Figure 9:
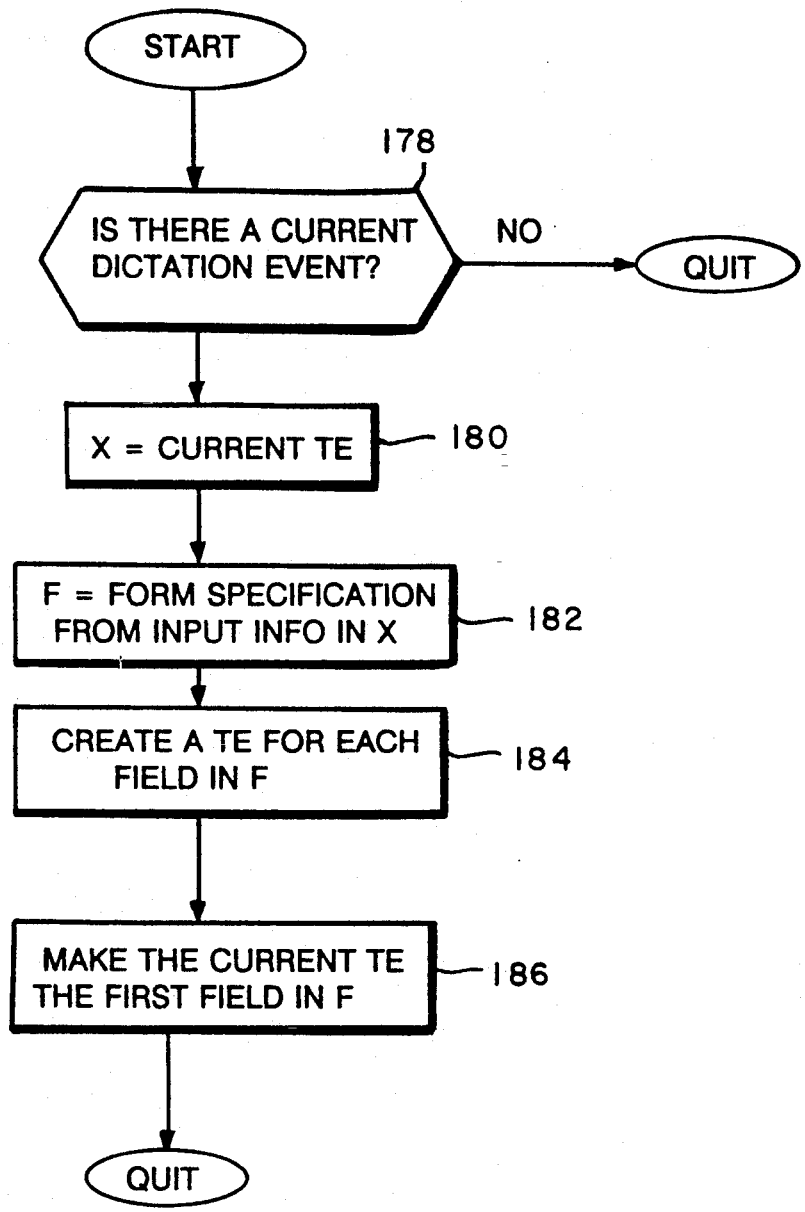
FIG. 9 is a flow chart of the operation of the system and method of the present invention in response to a "FILL IN FORM" command.

Referring to FIG. 9 after the system determines that there is an active dictation event in step 178, the system fetches the text event record associated with the active text event and the form corresponding to the active text event is pulled up from the input event information element 62 in step 182. The system then creates a text event record for each field in the form, and the system assigns the current text event as the first field in the form. The form is then filled in using other commands or by issuing other voice text input. As each field is filled in, the system progresses through the form to the next field until all the fields in the form have been filled in.

"NEXT CHOICE"—A phrase "NEXT CHOICE" is identified by the recognizer as a special phrase, the intent of which is to cause the effect of the previous voice command to be undone (as with the "SCRATCH THAT" command), and to substitute for the previous best matched recognition candidate, the recognition candidate with the next highest recognition score. In a preferred embodiment the actions taken in response to a "NEXT CHOICE" command are identical to those that would be taken if the "SCRATCH THAT" command were recognized. The best matched recognition candidate is then marked as invalid, and the remaining valid candidate with the highest score is then designated the best match and its translation is sent to the application. Note that the "NEXT CHOICE" command may be issued repeatedly for the same speech event. As the operation of this command is identical to a "TAKE TWO" command, its operation will be described below with respect to the "TAKE N" command.

TAKE N"—The phrases "TAKE TWO", "TAKE THREE", etc. are identified by the recognizer as special phrases. The intent of these phrases is to cause the effect of the previous voice command to be undone and to substitute for the previous best matched candidate a recognition candidate of position N in an "alternate list" which is displayed as a full or partial candidate list on a user's screen. The operation of this command is identical to the operation of the command "NEXT CHOICE", except the new best match recognition candidate is specified by the number "N" and by the order of candidates in the alternates lists.

Figure 10:
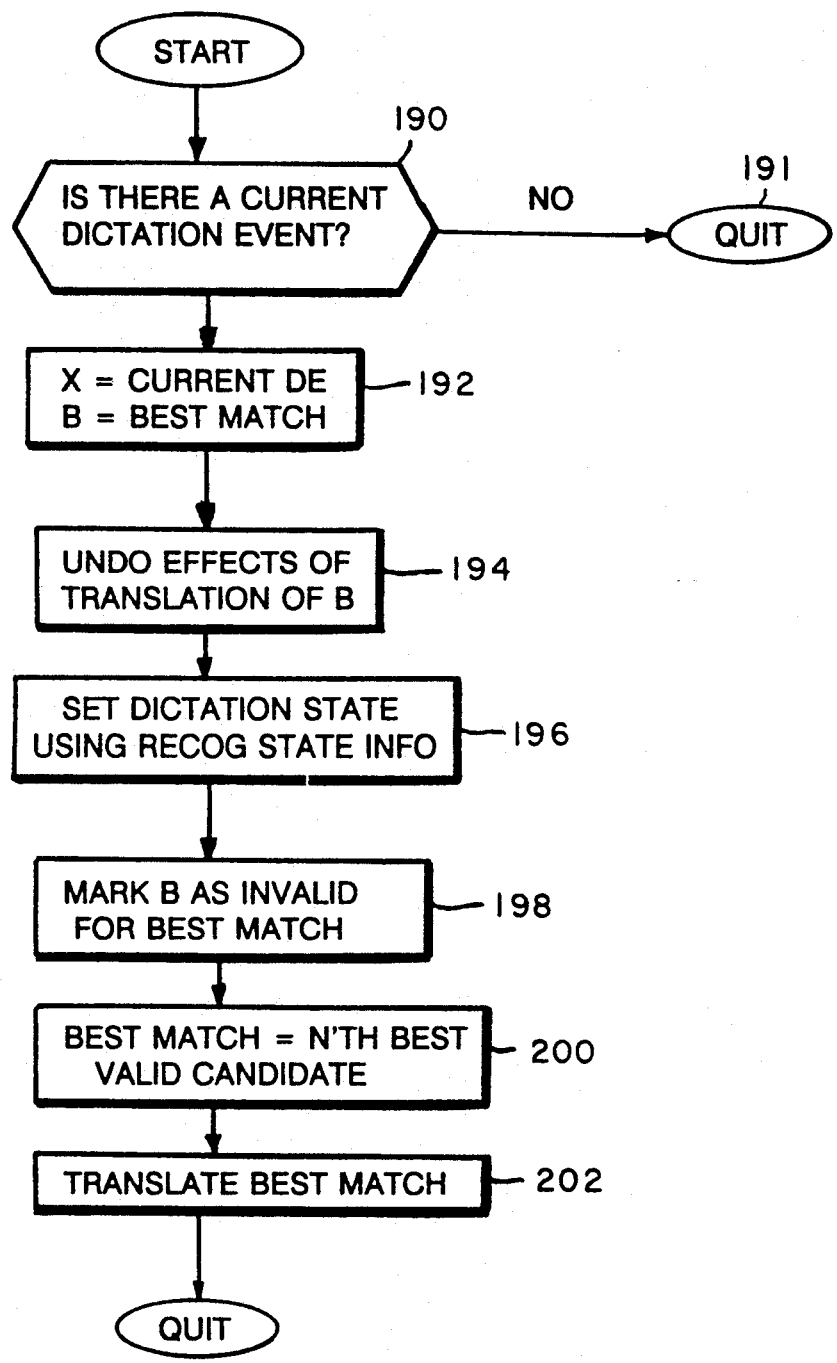
FIG. 10 is a flow chart of the operation of the system and method of the present invention in response to a "TAKE N" command.

As shown in FIG. 10, upon receiving a "TAKE N" command, the system determines the current dictation event and the best matched candidate for that dictation event. In step 194, the effects of the translation of the best match are undone and in step 196 the system resets the dictation state using the recognizer state information element 44. In the candidates set, the original best match candidate is marked as invalid so that it will not be chosen as best match again for the particular speech event, and in step 200 the system assigns the Nth candidate in the displayed candidate list as the best match. The new best match is then translated in step 202, and the system is then ready to process a new speech event.

"TRY AGAIN"—The phrase "TRY AGAIN" is identified by the recognizer as a special phrase. The intent of the phrase is to cause the effect of the previous voice command to be undone, as with the "SCRATCH THAT" command, and to prepare the recognizer to process another speech event, but in no case to allow the previous best matched candidate to be chosen as best match again. In a preferred embodiment actions are taken identical to those taken in response to a "SCRATCH THAT" command. The best matched recognition candidate is then marked as invalid and another speech event is processed. After a candidates list is prepared, all invalid candidates from the previous dictation event are marked invalid on the new list. The best matched candidate is then chosen form the remaining valid candidates in the new list.

Figure 11:
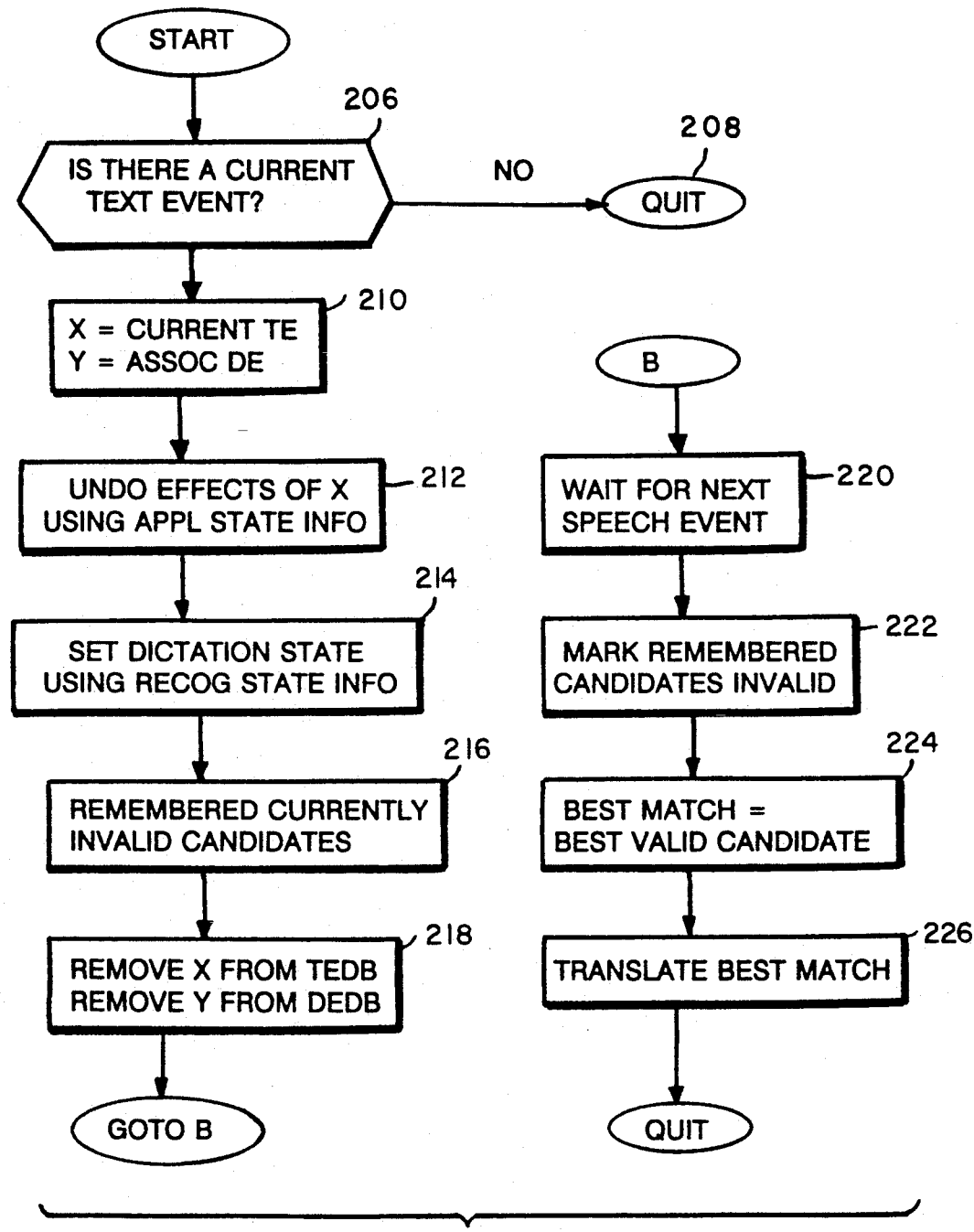
FIG. 11 is a flow chart of the operation of the system and method of the present invention in response to a "TRY AGAIN" command.

Referring to FIG. 11, the system initially determines in step 206 whether there is an active text event, and if there is an active text event, the associated dictation event record of the active text event is fetched in step 210. The system then removes the effects of the current text event in step 212 by using the information stored in the application state information element 64. The dictation state is reset using the recognition state information in element 44 in step 214, and the system notes all current invalid candidates in step 216. At that point, the system removes the active text event from the text event database and removes the associated dictation event record from the dictation database. The system then waits for the next speech event in step 220 which is the reissuing of the speech event which resulted in the incorrect translation. The invalid candidates are marked as invalid in step 222, and in step 224 the system assigns the valid candidate having the highest recognition score as the best match. This best matched candidate is then translated and sent on to the application.

Use of dictation and text events enhance the voice control of application programs as described above. A number of these commands use different variations of the backtracking capabilities that are made possible by the dictation and the text event records to implement concise and powerful user commands for undoing the effects of incorrectly recognized speech events. The commands described above that fall into this category are the "SCRATCH THAT", "NEXT CHOICE", "TAKE N", "TRY AGAIN" commands.

Many applications for which speech control is appropriate include the creation of documents of some sort. Word processing, database and spreadsheet programs are important examples. The use of dictation and text events imposes an important level of organization on the text in such documents, an organization in which the document is segmented into the speech events which created it. Boundary positions between text created by one speech event and text created by another can be reached efficiently using voice commands. Examples of these commands are the "BACK N", "FORWARD N" and "FORMS FILL IN" commands.

An important technique for improving recognizer accuracy is to have the recognizer "learn" from an individual user's past behavior so that the recognizer will recognize a user's speech more accurately in the future. A crucial requirement for such learning is reliably identifying which speech events are correctly recognized, which speech events are incorrectly recognized, what the correct and incorrect recognitions were, and so forth. A particular problem in meeting these requirements is that in many dictation modes, the correctness of recognition of a speech event is not known until one or more following speech events are also recognized. The correct association of speech event data, candidate sets, best matched candidate, application response, subsequent correction or confirmation by the user, and other factors requires a combined use of both dictation and text events.

The dictation event database is an efficient and effective way for modules within the recognizer to communicate. The formal definition of the characteristics of this database, the individual dictation event records, and the operations that can be carried out on them, allow the interfaces between the recognizer modules to be rigorously defined, effectively implemented, and reliably debugged.

While the foregoing invention has been described with reference to its preferred embodiments, various alterations and modifications will occur to those skilled in the art. All such modifications and alterations are intended to fall within the scope of the appended claims.

What is claimed is:

1. A system for editing displayed textual data generated in response to an audio input signal representing spoken input text, said system comprising:
    means for editing said generated textual data when said generated textual data is an incorrect translation of the spoken input text;
    means for distinguishing between audio input signals representing spoken input text and audio input signals representing spoken commands for editing said generated textual data;
    means for utilizing said audio input signals representing spoken commands to control said means for editing said generated textual data.

2. The system for editing displayed textual data of claim 1 further comprising:
    a dictation event subsystem for processing speech events, a speech event being a word or set of words spoken by a user of the system, said dictation event subsystem including means for translating a speech event into textual data and means for recognizing a speech event representing a voice command and initiating operation in response to said command;
    a text event subsystem for receiving said translations as an input event from said dictation event subsystem and for processing said translations, said text event subsystem controlling the output from said system to an application.

3. The system for editing displayed textual data of claim 2 wherein said dictation event subsystem further comprises a dictation event database including a plurality of dictation event records and wherein said text event subsystem further comprises a text event subsystem comprising a plurality of text event records.

4. The system for editing displayed textual data of claim 3 wherein each of said dictation event records comprises:
    means for storing a unique identifier for each record;
    means for storing information regarding the chronological relationship of each record to other dictation event records in said dictation event database;
    means for storing an associated candidate set and a best match in the set for each speech event in response to which a dictation event record is created.

5. The system for editing displayed textual data of claim 2 wherein each of said dictation event record comprises:
    means for storing recognizer performance information; and
    means for storing recognizer state information.

6. The system for editing displayed textual data of claim 2 wherein each of said dictation event records comprises means for storing implementation-dependent information.

7. The system for editing displayed textual data of claim 2 wherein each of said text event records comprise:
    means for storing the chronological relationship of the text event to other text events;
    means for storing the hierarchical relationship of the text event record to other text event records; and
    means for storing the relationship of each input event to other input events.

8. The system for editing displayed textual data of claim 2 wherein each of said text event records of said text event database further comprises means for storing information regarding the type of input event that generated a translation leading to the creation of the text event record.

9. The system for editing displayed textual data of claim 2 wherein said text event record includes means for storing the state of an application to which said translations are transmitted from said text event subsystem.

10. The system for editing displayed textual data of claim 2 wherein said text event subsystem further comprises:
    means for creating a text event record in said text event database for each input event transmitted to said text event subsystem, said text event record including means for storing the associated dictation event identifier and a unique handle identifying the text event record.

11. The system for editing displayed textual data of claim 1 wherein said means for utilizing audio signals representing spoken commands to control said means for editing comprises means for processing a vocal "FILL IN FORM" command by supplying generated textual data to a field in a form having at least one blank field, said data being provided by the supplying of voice input or voice commands following the issuing of said "FILL IN FORM" command.

12. The system for editing displayed textual data of claim 1 further comprising means for generating a candidate set of textual data in response to each audio input signal or set of signals, each candidate in said set representing a likely textual representation of the spoken input text.

13. The system for editing displayed textual data of claim 12, further comprising means for correcting, by using a spoken command, incorrectly generated textual data by deleting incorrectly generated textual data from displayed textual data and choosing an alternative candidate of said candidates set to replace said deleted displayed text.

14. The system for editing displayed textual data of claim 13 wherein said means for choosing an alternative candidate comprises means for processing a vocal "TAKE N" command that causes said system to select the Nth listed candidate of said candidate set as the correctly generated textual data.

15. A system for editing displayed textual data of claim 13, wherein said means for utilizing said audio input signals representing spoken commands to control said means for editing said generated text comprises means for correcting, by spoken command, an incorrect generation of textual data.

16. The system for editing displayed textual data of claim 15, wherein said means for correcting incorrectly generated textual data comprises means for deleting incorrectly generated textual data from displayed textual data by using a spoken command.

17. The for editing displayed textual data of claim 16 wherein said means to delete comprises means for processing a vocal "SCRATCH THAT" command that causes the erasing of textual data generated by said system.

18. The system for editing displayed textual data of claim 15 wherein said means for correcting incorrectly generated textual data comprises means for processing a vocal "BACKTRACK" command that enables the system to remove one or more occurrences of incorrectly generated textual data.

19. The system for editing displayed textual data of claim 15 wherein said means for correcting incorrectly generated textual data of claim 15 comprises means for processing a vocal "TRY AGAIN" command that causes said system to reattempt to generate textual data without selecting the best match candidate originally selected as the candidate for that speech input.

20. The system for editing displayed textual data of claim 1, wherein said means for utilizing said audio input signals to control said means for editing comprises means for moving an input location of the textual data about the displayed textual data through the use of a spoken command.

21. The system for editing displayed textual data of claim 20 wherein said means for moving said input position comprises means for processing a vocal "FORWARD N" command that enables a current input location of the system to be shifted N positions forward from the position where said "FORWARD N" command is issued.

22. A method for editing displayed textual data generated in response to an audio input signal representing spoken input text, said method comprising the steps of:
   editing said generated textual data by receiving audio signals representing spoken input textual data and spoken commands through an input device;
   analyzing said audio signals to determine whether said audio signals represent spoken input to be provided to an application or a spoken command for editing textual data.

23. The method for editing displayed textual data of claim 22 wherein said step of editing further comprises the steps of:
   deriving candidate sets of textual data in response to each audio signal or set of audio signals;
   deleting incorrectly generated textual data by using a spoken command;
   replacing said incorrectly generated textual data with another candidate of textual data from said candidate set by using a spoken command.

24. The method for editing displayed textual data of claim 22, wherein said step of editing further comprises the step of moving the input position about said displayed textual data, through the use of a spoken command.

25. The method for editing textual data of claim 24, wherein said step of editing further comprises inserting spoken textual data into a textual data form by issuing a spoken command to move to a location in a form into which spoken input text is to be provided.

* * * * *